United States Patent
Dodgson

(10) Patent No.: US 12,113,569 B2
(45) Date of Patent: Oct. 8, 2024

(54) METHOD OF ASSIGNING A BANDWIDTH FOR RADIO COMMUNICATION

(71) Applicant: Airbus Defence and Space Limited, Stevenage (GB)

(72) Inventor: Terence Dodgson, Stevenage (GB)

(73) Assignee: Airbus Defence and Space Limited, Stevenage (GB)

( * ) Notice: Subject to any disclaimer, the term of this patent is extended or adjusted under 35 U.S.C. 154(b) by 120 days.

(21) Appl. No.: 17/613,434

(22) PCT Filed: May 22, 2020

(86) PCT No.: PCT/GB2020/051259
§ 371 (c)(1),
(2) Date: Nov. 22, 2021

(87) PCT Pub. No.: WO2020/240163
PCT Pub. Date: Dec. 3, 2020

(65) Prior Publication Data
US 2022/0311473 A1    Sep. 29, 2022

(30) Foreign Application Priority Data
May 24, 2019   (GB) ..................................... 1907409

(51) Int. Cl.
*H04B 1/7143*   (2011.01)
*H04L 5/00*    (2006.01)

(52) U.S. Cl.
CPC ......... *H04B 1/7143* (2013.01); *H04L 5/0012* (2013.01); *H04L 5/003* (2013.01)

(58) Field of Classification Search
CPC ..... H04B 1/7143; H04L 5/0012; H04L 5/003; H04L 5/026; H04L 5/001
See application file for complete search history.

(56) References Cited

U.S. PATENT DOCUMENTS 5,995,533 A * 11/1999 Hassan .................. H04K 1/00
                                                        380/271
6,047,018 A *  4/2000 Emi ..................... H04L 27/30
                                                        375/135
(Continued)

FOREIGN PATENT DOCUMENTS

| CN | 101047402 A  | 10/2007 |           |
|----|--------------|---------|-----------|
| DE | 10211235 A1  | 10/2003 |           |
| EP | 0182762 A1 * |  7/1985 | H04K 1/00 |
| EP | 2015465 A2   |  1/2009 |           |

(Continued)

OTHER PUBLICATIONS

K. Stamatiou and J. G. Proakis, "Performance Analysis of a Coherent FH-MA System Based on Latin Squares," in IEEE Transactions on Wireless Communications, vol. 6, No. 11, pp. 4183-4192, Nov. 2007, doi: 10.1109/TWC.2007.060318. (Year: 2007).*

(Continued)

*Primary Examiner* — Ayaz R Sheikh
*Assistant Examiner* — Tarell A Hampton
(74) *Attorney, Agent, or Firm* — Greer, Burns & Crain, Ltd.

(57) ABSTRACT

There is provided a method of assigning use of a bandwidth for radio communication. The method includes the following steps: generating an initial frame, the initial frame including a series of allocations; generating a further frame, the further frame including a series of allocations; repeating the step of generating a further frame to generate a matrix of allocations; shuffling at least two columns or at least two rows within the matrix; selecting one or more columns or rows in the matrix, wherein each selected column or row represents a sequence; assigning use of the bandwidth according to the one or more selected sequences; and transmitting one or more data streams on the assigned bandwidth.

17 Claims, 14 Drawing Sheets

(56) References Cited

U.S. PATENT DOCUMENTS

| | | | |
|---|---|---|---|
| 6,125,378 A | 9/2000 | Barbano | |
| 6,707,768 B2 * | 3/2004 | Schilling, Jr. | G11B 27/105 369/30.08 |
| 6,909,737 B1 * | 6/2005 | Kockmann | H04B 1/713 375/E1.035 |
| 6,934,388 B1 | 8/2005 | Clark | |
| 7,386,026 B1 * | 6/2008 | Gold | H04B 1/7156 375/E1.003 |
| 9,514,169 B2 * | 12/2016 | Mattsson | G06F 21/6227 |
| 10,651,891 B1 * | 5/2020 | Gardiner | H04B 1/7143 |
| 2007/0291822 A1 * | 12/2007 | Staley | H04B 1/7143 375/E1.035 |
| 2013/0163516 A1 * | 6/2013 | Baek | H04W 24/02 370/328 |
| 2020/0154405 A1 | 5/2020 | Yuan et al. | |

FOREIGN PATENT DOCUMENTS

| | | | | |
|---|---|---|---|---|
| EP | 2271023 A1 | * | 1/2011 | H04B 1/7143 |
| GB | 2337669 A | * | 11/1999 | H04B 1/713 |
| WO | WO-2014172468 A1 | * | 10/2014 | H04B 1/7143 |
| WO | WO-2016020751 A2 | * | 2/2016 | H04B 1/7143 |
| WO | WO-2019014938 A1 | * | 1/2019 | H04B 1/713 |

OTHER PUBLICATIONS

Communication pursuant to Article 94(3) EPC from corresponding European application No. 20 729 170.9, dated Jan. 1, 2023.
International Search Report; priority document.
G. J. Pottie et al., "Channel Coding Strategies for Cellular Radio" IEEE Transactions on Vehicular Technology, IEEE Service Center, vol. 44, No. 4, Nov. 1, 1995, pp. 763-770, New Jersey USA.

* cited by examiner

METHOD OF ASSIGNING A BANDWIDTH FOR RADIO COMMUNICATION

CROSS-REFERENCES TO RELATED APPLICATIONS

This application claims the benefit of the International Application No. PCT/GB2020/051259, filed on May 22, 2020, and of the Great Britain patent application No. 1907409.5 filed on May 24, 2019, the entire disclosures of which are incorporated herein by way of reference.

FIELD OF THE INVENTION

The present invention concerns a method of assigning a bandwidth for radio communication, and transmission of one or more data streams on the assigned bandwidth. More particularly, but not exclusively, the present invention concerns a method of generating one or more frequency-hopping or time-hopping sequences for spread spectrum transmission over a bandwidth comprising a plurality of sub-bands. The invention also concerns satellite and/or terrestrial communications systems configured to generate sequences using such methods, for example modems configured as such.

BACKGROUND OF THE INVENTION

Spread spectrum techniques are used in communications systems to increase resistance to jamming and/or eavesdropping by spreading a signal in the frequency domain, thereby providing a signal with a wider bandwidth. Pre-determined sequences, often pseudorandom, control the particular spreading pattern of the signal across the bandwidth.

Frequency switching (or "hopping") in spread spectrum transmission is a type of spread spectrum technique, in which the available bandwidth is divided into sub-bands, between which the carrier frequency rapidly switches. In addition to resisting jamming and eavesdropping, frequency-hopping increases reliability of communications by protecting signal quality against frequency-selective fading and/or interference.

The frequency-hopping is controlled using a sequence which can be determined by both a transmitter and a receiver. The sequence is often pseudo-random but may be deterministic.

An example of a prior art methodology utilizing a pseudo-random sequence is described in EP2015465A2. The document provides a method for generating frequency-hopping sequences for a duplex communication system (one in which the transmitter and receiver are active at the same time) in selected frequency bands. For given frequency bands available, a group of frequency-hopping sequences is generated as follows: pairs of sub-frequency bands (transmit and receive) are identified; a frequency-hopping sequence is defined as an integer sequence for a given transmission path; for each change of a master clock pulse, the next integer of the frequency-hopping sequence is assigned to the center frequency of the transmit frequency band—the receive sub-frequency band identified as a pair is then also associated with that jump time; once the center frequencies of the sub-frequency band pairs are determined, hop frequencies are defined within the sub-band that can be used in a transmission.

DE10211235A1 discloses a method for generating a frequency-hopping sequence. The document discloses determining a periodic frequency-hopping sequence by specifying a hop bandwidth and an n-ary integral sequence. It discloses dividing the available frequency band into non-overlapping sub-bands and using a first periodic sequence to select a defined band per time marker of a hopping timer. Each sub-band has a defined number of different hop frequencies. A second periodic sequence is used to select a defined band per time marker of a frequency-hopping timer in order to satisfy a given relationship between frequency and bandwidth.

The present invention seeks to provide an improved method of generating frequency-hopping sequences.

SUMMARY OF THE INVENTION

In a first aspect, the invention provides a method of assigning use of a bandwidth for radio communication, the method comprising the following steps: generating an initial frame, the initial frame comprising a series of allocations; generating a further frame, the further frame comprising a series of allocations; repeating the step of generating a further frame to generate a matrix of allocations; shuffling at least two columns or at least two rows within the matrix; selecting one or more columns or rows in the matrix, wherein each selected column or row represents a sequence; assigning use of the bandwidth according to the one or more selected sequences and transmitting one or more data streams on the assigned bandwidth.

The method of the present invention has been found to enable fast, reliable, secure and robust generation of sequences for assigning bandwidth in radio communications. The generated sequences are orthogonal (meaning that the allocations do not overlap, thereby minimizing interference) and reduce redundancy. The method of the invention presents an advantage over methods of the prior art, enabling more efficient utilization of the available bandwidth.

In a further advantage over methods of the prior art, the method of the present invention guarantees zero clashes: the method of the present invention does not require manual adjustments to remove allocation overlaps at any given sequence position, thereby providing a faster and more efficient method of assigning bandwidth. Assigning use of a bandwidth may comprise assigning frequencies (i.e., allocations may comprise frequency allocations), for example assigning channels or assigning sub-bands within an allocated channel Assigning use of a bandwidth may comprise assigning time slots (i.e., allocations may comprise time-slots). In embodiments wherein allocations comprise frequency allocations, the method may comprise transmitting one or more data streams over every available frequency allocation simultaneously.

The method may comprise transmitting one or more data streams over every available sub-band simultaneously.

"Bandwidth" may be satellite bandwidth. Satellite bandwidths fall within the range of around 1 GHz for very high frequency transmission to around 40 GHz for extremely high frequency transmission. The invention may be used within the ultra-high frequency range i.e., 300 MHz-3 GHz. The bandwidth may alternatively be any radio frequency bandwidth, for example for terrestrial communications.

"Assigning use of a bandwidth" may comprise assigning frequency sub-bands within a bandwidth for spread-spectrum transmission. "Assigning use of a bandwidth" may additionally or alternatively comprise varying the time pattern of a transmission over a fixed bandwidth. "Assigning use of a bandwidth" may alternatively comprise assigning frequency channels for a duration of time, for example in an initial satellite commissioning process.

There may be a few allocations, for example 3 or 4 allocations, or of the order of 100 or 1000 allocations.

A "frame", for example the initial frame, may be a horizontal frame, or may be a vertical frame. The series of hops may be a random or pseudo-random series of hops.

The matrix may be two-dimensional. The matrix may be square. The matrix may be rectangular.

"Shuffling" may include re-ordering, for example swapping in pairs.

Shuffling does not necessarily include swapping in pairs, and may include swapping between or within groups of three, four or more columns or rows. The step of shuffling may or may not result in a net shuffle of columns or rows within the matrix (i.e., as long as there is a step of shuffling, it does not matter what the end result of the shuffled columns or rows is).

The method may be implemented in hardware.

The method may be a method of generating one or more frequency-hopping sequences for frequency-hopping spread spectrum transmission, wherein the bandwidth comprises a plurality of sub-bands, and wherein the allocations are hops, each hop representing a different sub-band. In a frequency-hopping application, the invention provides certain additional benefits. The generated sequences are not predictable, which is a requirement for frequency-hopping transmission security. The unpredictable nature of the sequences arises from two factors: the generation of the initial frame, and the subsequent shuffling.

In the context of a frequency-hopping application, the orthogonality of the generated sequences means that no data stream occupies the same frequency sub-band as any other data stream at any time during transmission, thereby, in an advantage over systems and methods of the prior art, enabling more efficient utilization of the available bandwidth. In a further advantage over systems and methods of the prior art in the case of a frequency-hopping application, the method of the present invention accommodates a single user or multiple users and additionally enables a fully loaded system (i.e., simultaneous transmission across all sub-bands), without interference between data streams.

In a frequency-hopping application, the method of the invention advantageously provides anti jam resilience, for example in satellite-to-ground or satellite-to-air communications, or in terrestrial communications.

"Frequency-hopping sequence" is a well-known term of the art and means a pattern according to which a signal hops between frequency sub-bands.

In the case of frequency-hopping, the number of sub-bands may be calculated as the bandwidth (i.e., the hopping bandwidth) divided by the signal modulation bandwidth. The number of sub-bands may be equal to the number of data streams to be transmitted (in the case of full system occupancy).

"Hop" is a well-known term of the art and means transition from one frequency sub-band (i.e., frequency bin) to another frequency sub-band. The carrier frequency transitions from sub-band to sub-band successively according to the frequency-hopping sequence, which may be random or pseudo-random in nature.

In the case of frequency-hopping transmission, the number of columns or rows selected may correspond to a number of data streams deployed.

The frequency-hopping sequences may be satellite communication frequency-hopping sequences. The transmitting may be to or from a communications satellite.

The method may be a method of generating one or more time-hopping sequences for time-hopping transmission, wherein the allocations are time-slots.

"Time-hopping sequence" is a well-known term of the art and means a sequence according to which a carrier signal is turned on and off (i.e., according to which the period and duty cycle are varied). Time-hopping may be used in isolation, or in combination with frequency-hopping in a spread spectrum application.

While the embodiments of the present invention are herein described in detail in terms of frequency-hopping, it will be understood by the person skilled in the art that the invention could equivalently apply to time-hopping as an alternative form of spread spectrum modulation. In such an application, the sequences generated by the method of the present invention would be patterns of hop time-slots, rather than patterns of hop frequencies. The above listed advantages including sequence orthogonality and efficient utilization similarly apply. Use of the present invention in a time-hopping application may require increased storage of date, e.g., time buffering, since time-hopping would not implemented hop-by-hop (it is not possible to hop backwards in time).

The method may be a method of radio resource allocation, wherein the allocations are frequency channels. In such an application, the sequences generated by the method of the present invention would be patterns/distributions of frequency channel allocations, rather than patterns of hop frequencies or time-slots. In such an application, the method of the invention provides similar advantages in ensuring efficient allocation of available bandwidth between multiple users, for example in satellite commissioning. In such an application, the carrier frequency would retain an allocated frequency channel for the duration of the communication, or as otherwise required.

The step of generating a further frame may comprise performing cyclical shifting, wherein the cyclical shifting comprises shifting each allocation (e.g., hop) in the series of allocations. The allocations (e.g., hops) may be shifted by one allocation position. The cyclical shifting may additionally comprise writing the end-allocation of the initial frame to the beginning-allocation of the further frame. The step of generating a further frame may alternatively comprise generating independently, a further frame. Cyclic shifting may provide a simple and efficient method of generating orthogonal sequences. The orthogonality would then be preserved by the method step of shuffling at least two columns or at least two rows.

The step of generating an initial frame may comprise pseudo-random generation using a shuffle algorithm. For efficient use of bandwidth, for example satellite bandwidth in a frequency or time-hopping application, the initial frame may utilize every available allocation, once. Pseudo-random generation of an initial frame may be especially beneficial for ensuring unpredictability of the generated hopping sequences in a frequency-hopping or time-hopping application, making them harder to jam.

The step of generating a further frame and then repeating that step, may result in generating the same number of frames as the number of allocations in the initial frame i.e., it may result in the generation of a square two-dimensional matrix. Such a matrix may advantageously enable full system occupancy (i.e., simultaneous transmission across the entire available bandwidth) in a frequency-hopping application where the number of data streams is equal to the number of sub-bands, or full channel utilization in a satellite radio resource allocation application.

The step of shuffling at least two columns or at least two rows may comprise pseudo-random shuffling using a shuffle algorithm Pseudo-random shuffling in conjunction with, or separately from, pseudo-random generation of an initial frame may be especially beneficial for ensuring unpredictability of the generated sequences, for example in a frequency-hopping or time-hopping application, making the data transmissions harder to jam.

The pseudo-random generation and/or the pseudo-random shuffling may comprise generating a pseudo-random number based on time-of-day. An external random number generator may be used. The external random number generator may be accessible to both a transmitter and a receiver. For example, the transmitter and receiver, which are typically synchronized, may each send a time-of-day time stamp to the external random number generator, which may then generate secret (i.e., which only the transmitter and receiver can interpret) pseudo-random data based on the time-of-day and communicate this back to the transmitter and receiver. The pseudo-random data may then be interpreted by the transmitter and receiver to generate a seed for the pseudo-random generation of the initial frame and/or the pseudo-random shuffling Using an external random number generator in this manner may be advantageous because, since there is an additional calculation step between time-of-day and seed generation, any jammer listening in, will not be able to determine the subsequently generated pseudo-random number. Furthermore, there is no transmission of the seed itself, thereby providing additional communication security.

The shuffle algorithm may be a Fisher-Yates (Fisher, Ronald A.; Yates, Frank (1948) [1938]. Statistical tables for biological, agricultural and medical research (3rd ed.). London: Oliver & Boyd. pp. 26-27), Knuth (Knuth, Donald E. (1969). Seminumerical algorithms. The Art of Computer Programming 2 Reading, MA: Addison-Wesley. pp. 139-140) or Sattolo (Sattolo, Sandra (1986 May 30). "An algorithm to generate a random cyclic permutation". Information Processing Letters. 22 (6): 315-3017) algorithm. Alternatively, the shuffle algorithm may be another type of shuffle algorithm.

There may be a further step of repeating the steps of generating an initial frame, generating a further frame, repeating generating a further frame to generate a matrix and shuffling at least two columns or two rows, thereby generating one or more additional matrices with shuffled columns or rows. In a frequency-hopping application, such a step may be necessary for example if the number of data streams to be transmitted exceeds the number of frequency-hopping sequences generated.

The method may comprise, before the step of shuffling, repeating M times the steps of generating an initial frame and generating one or more further frames to provide M matrices of allocations (e.g., hops). In a frequency-hopping application, such a method advantageously enables generation of M frequency-hopping sequences for any given data stream, resulting in fewer repeats of the method required for any given transmission (since the frequency-hopping sequences from the M matrices may be effectively joined end-to-end).

The method may comprise the step of shuffling at least two columns or rows between the M matrices such that the net result of the shuffling is that there is at least one column or row shuffled in every matrix. The step of shuffling between the M matrices may comprise pseudo-random shuffling using a shuffle algorithm. An advantage provided by the net result of the shuffling between the M matrices being that there is at least one column or row shuffled from one matrix to another matrix is that there can be repeats (up to a maximum of M times for any given allocation) of allocations within any generated sequence, without compromising orthogonality of the generated sequences. In a further advantage, since M is unknown, there is an additional level of unpredictability.

The method may comprise the steps of, before shuffling, combining the M matrices, and after shuffling, splitting out the combined matrices into M separate matrices.

M may be a user-determined number. M may be a pseudo-randomly generated number. The latter may provide an additional level of unpredictability, hence enhancing security in transmission.

In a frequency-hopping or time-hopping application, the method may additionally comprise the step of receiving the one or more transmitted data streams, and extracting information from the one or more data streams using the one or more selected sequences.

When acquiring a data stream which has been transmitted using a frequency-hopping or time-hopping sequence (i.e., a hopping signal), information about the hopping sequence, or a means of re-generating it, is necessary. The hopping sequences may be transmitted from the transmitter to the receiver or vice versa, for example, prior to data stream transmission. Alternatively, the hopping sequences may be independently generated by the transmitter and receiver. For example, the external random number generator may be in communication with both the transmitter and receiver, such that the transmitter and receiver can calculate the same seeds based on time-of-day for pseudo-random generation of the initial frame and/or pseudo-random shuffling. In such an application, the transmitter and the receiver are synchronized.

In a second aspect, the invention provides a communications terminal comprising a transmitter, the transmitter comprising a sequence generation module configured to perform steps a-e of the method of the first aspect of the invention wherein the method is a method of generating one or more frequency-hopping or time-hopping sequences, and the transmitter configured to assign use of a bandwidth according to the one or more selected sequences and to transmit one or more data streams on the assigned bandwidth in accordance with the one or more selected sequences.

The communications terminal may be a satellite communications terminal.

The communications terminal may further comprise a receiver, the receiver comprising a sequence generation module configured to perform steps a-e of the method of the first aspect of the invention wherein the method is a method of generating one or more frequency-hopping or time-hopping sequences, and the receiver configured to receive one or more data streams and extract information from the one or more data streams using the one or more selected sequences.

In a third aspect, the invention provides a modem configured for use in the communications terminal of the second aspect of the invention, wherein the modem is a software-defined radio satellite modem.

In a fourth aspect, the invention provides a computer program configured to execute the steps of the method of the first aspect of the invention.

In a fifth aspect, the invention provides a method of generating one or more frequency-hopping sequences for frequency-hopping spread spectrum transmission over a bandwidth comprising a plurality of sub-bands, the method comprising the following steps: generating an initial frame, the initial frame comprising a series of hops wherein each hop represents a different sub-band; generating a further frame, the further frame comprising a series of hops wherein each hop represents a different sub-band; repeating the step of generating a further frame to generate a matrix of hops; and shuffling at least two columns or at least two rows within the matrix.

The plurality of sub-bands may be of the order of a few sub-bands or of the order of 100 or 1000 sub-bands.

There may be a further step of selecting one or more columns or rows in the matrix, wherein each selected column or row represents a frequency-hopping sequence.

In a sixth aspect, the invention provides a method of frequency-hopping spread spectrum transmission over a bandwidth comprising a plurality of sub-bands, the method comprising the steps of: generating one or more frequency-hopping sequences using the method of the fifth aspect of the invention; and transmitting one or more data streams on the bandwidth, in accordance with the one or more frequency-hopping sequences.

In a seventh aspect, the invention provides a method of extracting information from one or more data streams transmitted according to the method of the first aspect of the invention wherein the method is a method of generating one or more frequency-hopping or time-hopping sequences, the method comprising the following steps: generating an initial frame, the initial frame comprising a series of allocations; generating a further frame, the further frame comprising a series of allocations; repeating the step of generating a further frame to generate a matrix of allocations; shuffling at least two columns or at least two rows within the matrix; selecting one or more columns or rows in the matrix, wherein each selected column or row represents a sequence; receiving the one or more transmitted data streams; and extracting information from the one or more transmitted data streams using the selected sequences.

It will of course be appreciated that features described in relation to one aspect of the present invention may be incorporated into other aspects of the present invention, where sense allows. For example, the method of the invention may incorporate any of the features described with reference to the apparatus of the invention and vice versa. The method of generating one or more time-hopping sequences may include any of the features described with reference to the method of generating one or more frequency-hopping sequences. The method of generating one or more radio resource allocation sequences may include any of the features described with reference to the methods of generating one or more time-hopping or frequency-hopping sequences.

BRIEF DESCRIPTION OF THE DRAWINGS

Two embodiments of the present invention will now be described by way of example only, with reference to the accompanying schematic drawings of which.

DETAILED DESCRIPTION OF THE PREFERRED EMBODIMENTS

Figure 1:
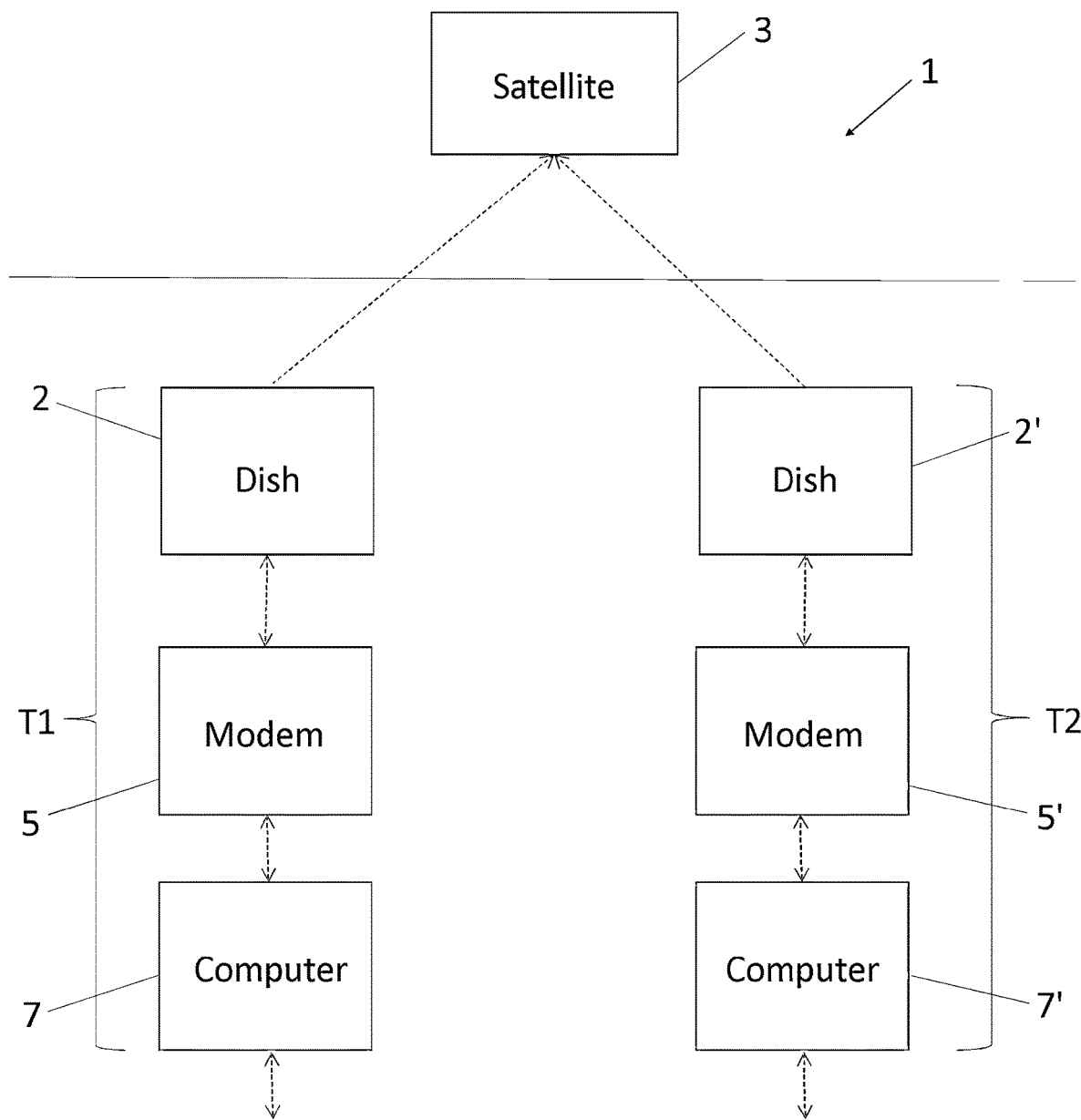
FIG. 1 is a schematic diagram of a satellite communications system in accordance with the first and second example embodiments of the invention.

In a first example embodiment of the invention, an interference resilient satellite communications system 1 (FIG. 1) is configured to operate a frequency-hopping communication scheme. The system includes a communications satellite 3 and four moveable ground-based terminals T1, T2, T3, T4 (T1 and T2 only, shown in FIG. 1). Each terminal (for ease of illustration, referring only to the components for terminals T1 and T2) comprises a dish 2, 2' (i.e., an antenna) configured to transmit and receive a satellite signal, a modem 5, 5' and a computer 7, 7'. The four terminals T1, T2, T3 and T4 are in communication via the satellite 3 over a shared bandwidth to a remote moveable ground-based terminal T10 (not shown). The four terminals T1, T2, T3 and T4 may be considered as transmitting terminals (although they also have capability for receiving signals) and the remote terminal T10 may be considered as a receiving terminal (although it also has capability for transmitting). In an alternative embodiment, some or all of the terminals T1, T2, T3, T4, T10 may be fixed ground-based terminals or air-based terminals. The computer 7, 7' functions to generate data for transmission (and to process data from transmission) and could in an alternative embodiment be any other data generation means.

In the first example embodiment of the invention, each of the transmitting terminals T1, T2, T3, T4 transmits via two data streams, a low data rate stream of the order of 100 kbps and a medium data rate stream of the order of 10 Mbps. There is therefore a total of eight data streams which may require simultaneous transmission across the same bandwidth. In another embodiment, outgoing and incoming signals may compete for the same bandwidth, for example if the uplink and downlink frequencies overlap (in such an application all frequencies would likely be included in the hopping selection). In the first example embodiment of the invention, each of the modems 5, 5' is a transmitting and receiving software-defined radio-based satellite modem. The transmitting terminals T1, T2, T3, T4 are essentially identical. In another embodiment of the invention, the terminals may differ, for example, some of the modems may only have transmitting capability, or only receiving capability.

Figure 2:
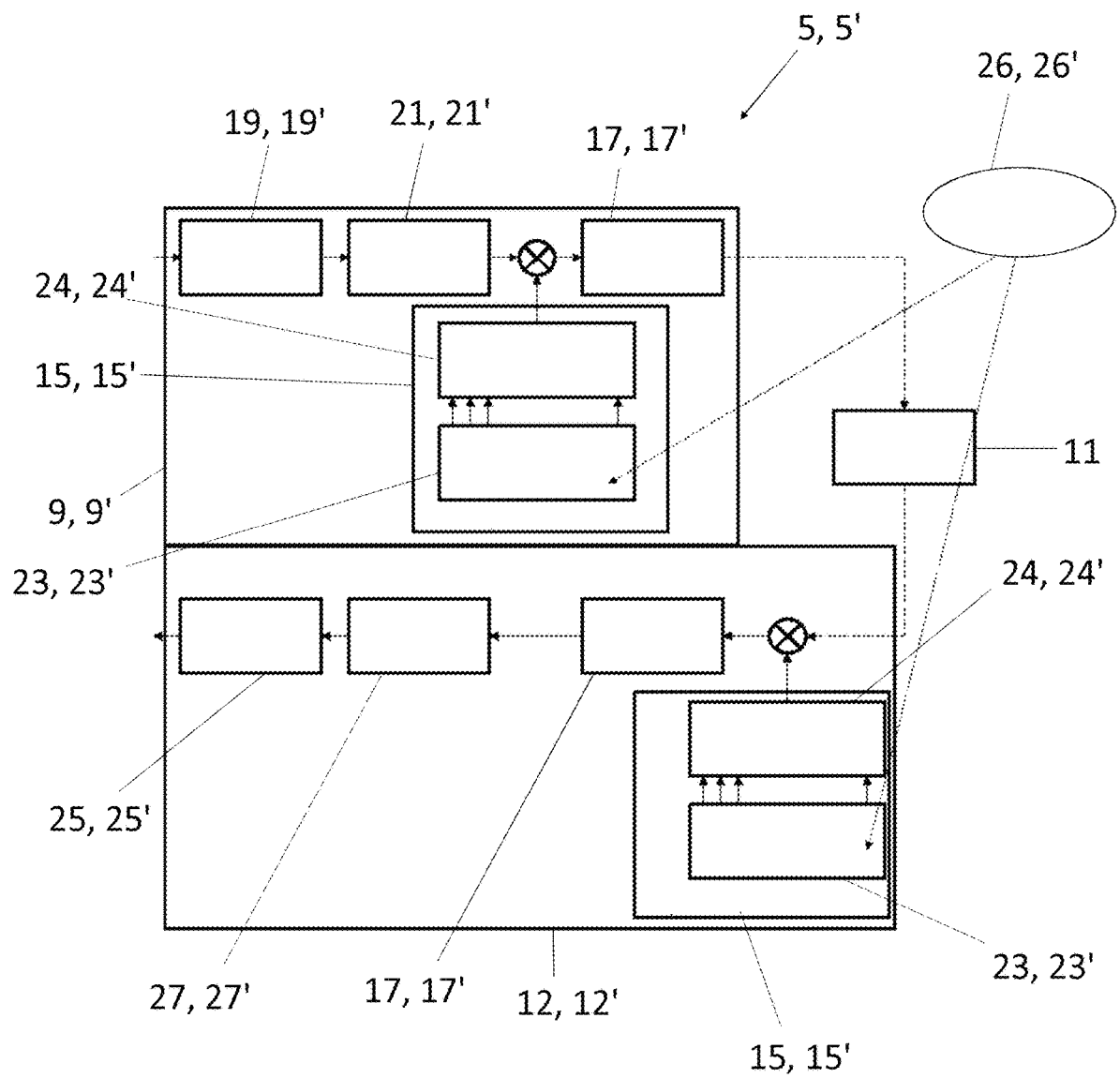
FIG. 2 is a schematic diagram of the modems in the satellite communications system of FIG. 1.

Each modem 5, 5' includes a transmitter 9, 9', configured to provide an analogue signal to an upconverter (not shown) for transmission to the communications satellite 3 via a communications channel/link 11 (FIG. 2). Each modem 5, 5' also includes a receiver 12, 12' configured to receive a signal from the communications satellite 3 via a down-converter (not shown). The transmitter 9, 9' and receiver 12, 12' each include a coder 19, 19' or decoder 25, 25', modulator 21, 21' or demodulator 27, 27', and bandpass filter 17, 17', as is known in the art and not discussed in detail herein. Data to be transmitted is provided to the coder 19, 19' of the transmitter 9, 9' and coded using forward error correction techniques, and then provided to the modulator 21, 21' for modulation of the carrier signal. The carrier signal is then combined with the generated frequency-hopping signals, for transmission across the spread spectrum bandwidth. The transmitter 9, 9' and receiver 12, 12' each include a sequence generator module 15, 15' realized through a combination of hardware and software. The sequence generator module 15, 15' includes a software number generator 23, 23' and a hardware frequency synthesizer 24, 24'. The number generator 23, 23' uses input data (from an external time-of-day random number generator 26, 26') coupled to its internal algorithms to produce frequency-hopping sequences which are fed to the frequency synthesizer 24, 24' and used to construct or deconstruct the spread spectrum signal for transmission (using known signal processing techniques). Both the transmitter 9, 9' and receiver 12, 12' are in communication with the external time-of-day random number generator).

In the first example embodiment of the invention, a plurality of frequency-hopping sequences are generated on the transmit side (i.e., by terminals T1, T2, T3 and T4) by the sequence generator module 15, 15' in the transmitter 9, 9'. In an alternative embodiment, a single computer remote from and in communication with each of the transmitting terminals (T1, T2, T3 and T4) may generate frequency-hopping sequences which are then communicated to each of the transmitting terminals. In the first example embodiment of the invention, identical frequency-hopping sequences are generated on the receive side (i.e., by terminal T10) by the sequence generator module 15, 15' in the receiver 12, 12'. In an alternative embodiment, the frequency-hopping sequences may be communicated securely to (but not independently generated by) receiving terminal T10.

Figure 3:
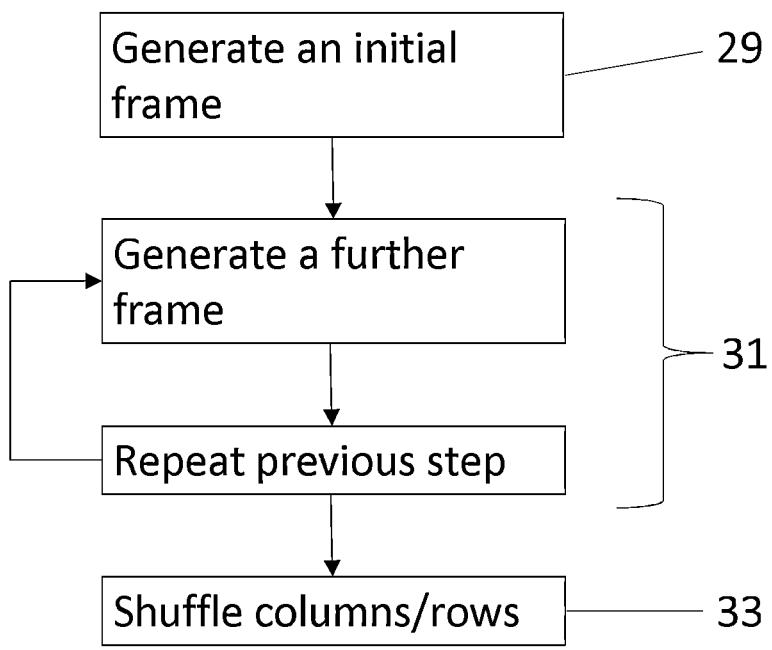
FIG. 3 is a high-level method flow diagram in accordance with the first and second example embodiments of the invention.

In the first example embodiment of the invention, the sequence generator module 15, 15' executes a series of steps to generate a plurality of hopping sequences (FIG. 3). At a high level, the method of the first example embodiment of the invention comprises the following steps: a first (i.e., initial) frame of hops is generated 29. Further frames are then generated, to provide a matrix of hops 31. After generation of the matrix, columns or rows are shuffled within the matrix, to re-order the hops 33.

In the first example embodiment of the invention, there are in total, eight data streams to be transmitted. The present example embodiment of the invention assumes full system occupancy wherein all data streams are transmitted simultaneously without interference. Therefore, eight, orthogonal, frequency-hopping sequences are required. In an alternative embodiment of the invention, with only partial system occupancy wherein only some of the data streams are transmitted simultaneously without interference, fewer than eight, orthogonal, frequency-hopping sequences may instead be required.

Figure 4:
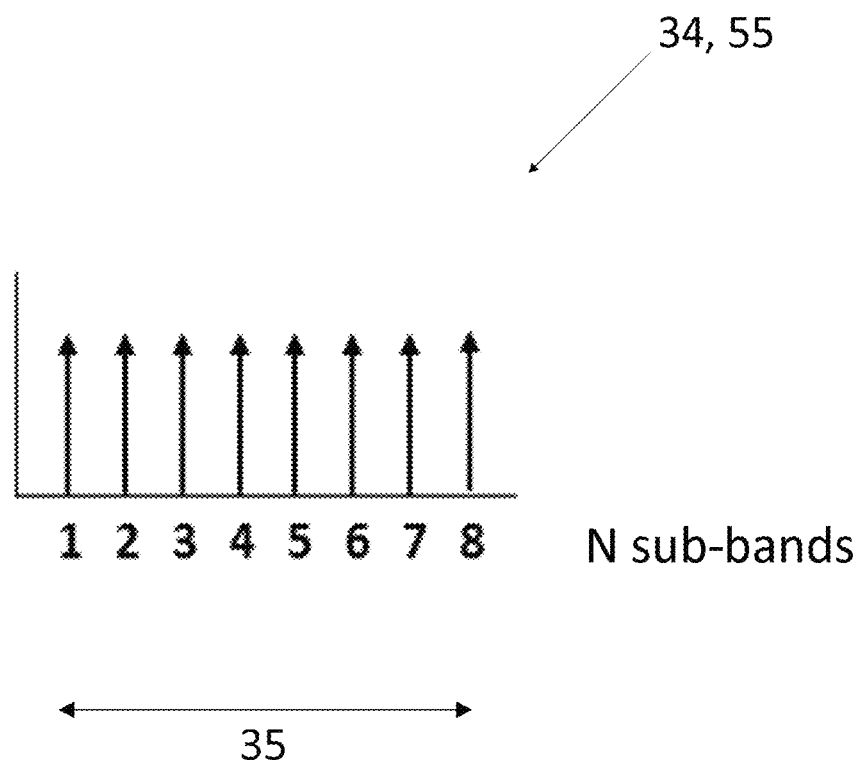
FIG. 4 is a schematic diagram of a transmission bandwidth split into frequency sub-bands in accordance with the first and second example embodiments of the invention.

In more detail, the method of the first example embodiment of the invention comprises the following steps: in a first step 34 of the method of the first example embodiment of the invention, the available transmission bandwidth 35 is divided into a number, N of distinct (i.e., non-overlapping) frequency sub-bands (FIG. 4). In the first example embodiment of the invention, N=eight. As stated above, in the example embodiment of the invention, the number of sub-bands, N=eight, corresponds to the number of data streams to be transmitted, thus allowing for full system loading as will be described further herein. Each sub-band has a center frequency, over which data may be transmitted.

Figure 5:
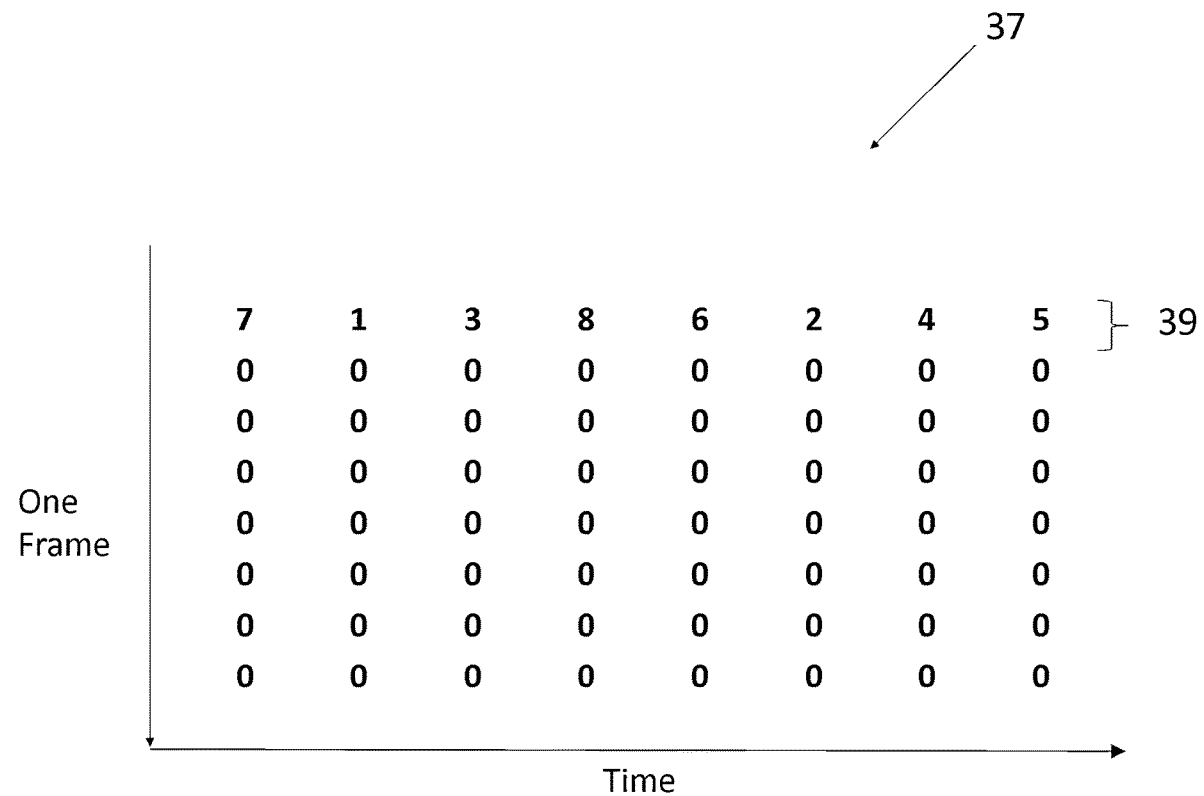
FIGS. 5-8 are schematic diagrams of the steps of the method of the first example embodiment of the invention.

In a second step 37 of the method of the first example embodiment of the invention, a shuffle algorithm is run once, acting on a pseudo-random seed created using the time-of-day, to generate a single (i.e., an initial) hopping frame 39 containing a pseudo-random ordering of the eight sub-band frequencies (i.e., in the first example embodiment of the invention, a pseudo-random ordering of the digits 1-8 representing the eight sub-bands) (FIG. 5). In the first example embodiment, the shuffle algorithm used is Fisher-Yates, although others could also be used. To generate the seed, a time stamp is communicated from the transmitter/receiver to the external time-of-day random number generator, which transmits back pseudo-random data based on the time-of-day which acts as a seed for the generation of the initial hopping frame 39. Since the transmitter and receiver are synchronized, the same frequency-hopping sequences are generated on both the transmit and receive sides.

Figure 6:
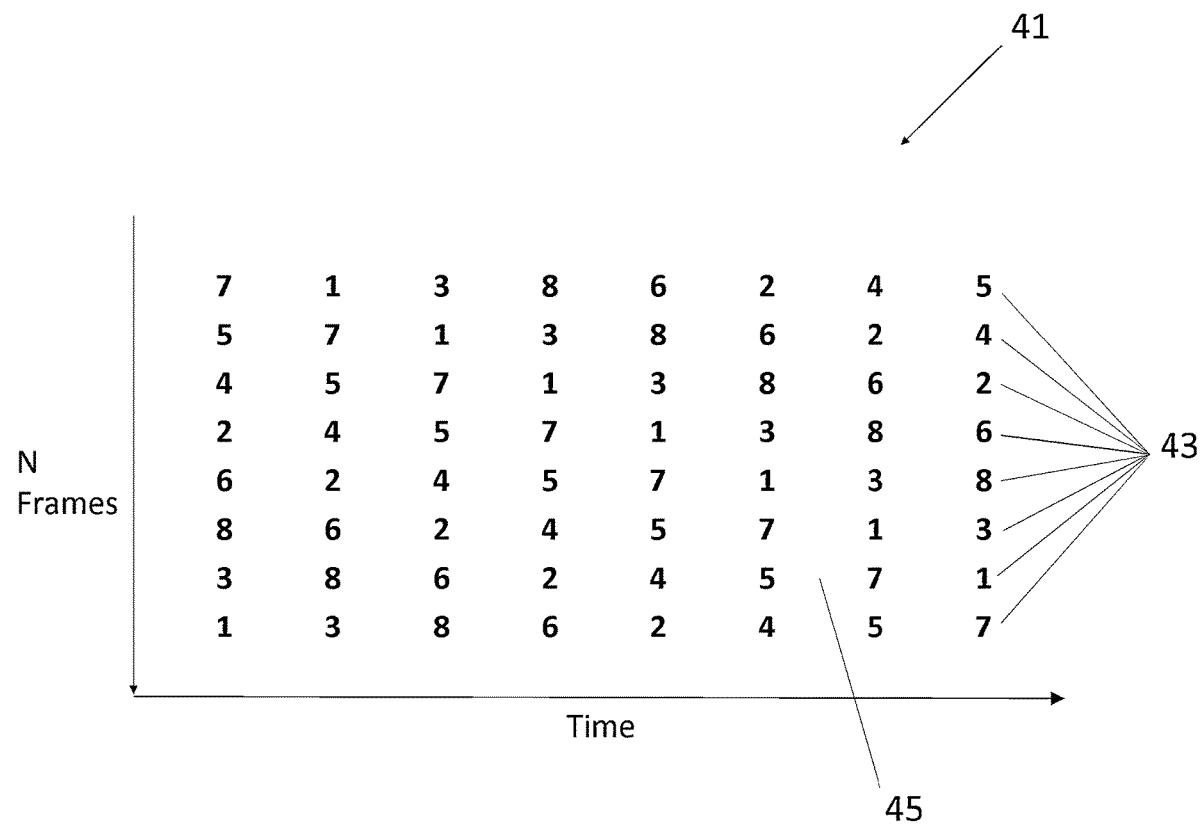

In a third step 41 of the method of the first example embodiment of the invention, N−1 (i.e., in the present case, seven) further hopping frames are generated, thereby generating a total of N frames 43 (FIG. 6). The further hopping frames are generated by shifting each digit/frequency one hop position to the right and writing the end hop of each frame to the beginning hop of each subsequent frame. Such "cyclic shifting" provides a two dimensional N×N square matrix 45.

Figure 7:
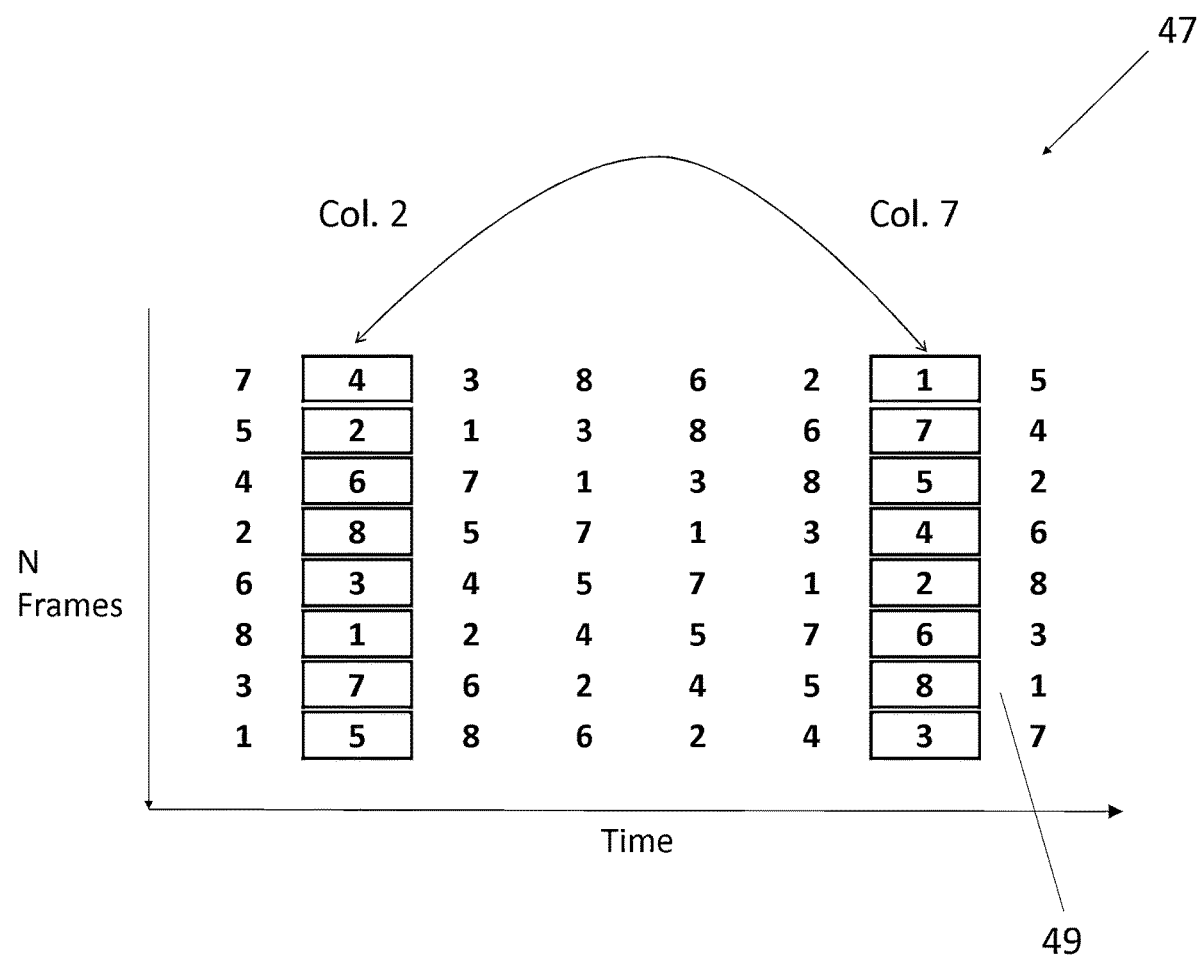

In a fourth step 47 of the method of the first example embodiment of the invention, a further shuffle algorithm is run (in the example embodiment of the invention, also Fisher-Yates), acting on a second, different, pseudo-random time-of-day seed, to shuffle the columns of the matrix (FIG. 7). In the first example embodiment of the invention, columns two and seven have been swapped in the pseudo-random shuffle providing a shuffled matrix 49. In the first example embodiment for ease of illustration, only two columns have been shuffled. In another embodiment more than two columns may be shuffled, or all of the columns may be shuffled. The skilled person will immediately understand that more complex embodiments fall within the scope of the invention, for example having longer sequences and/or having more extensive shuffling.

Figure 8:
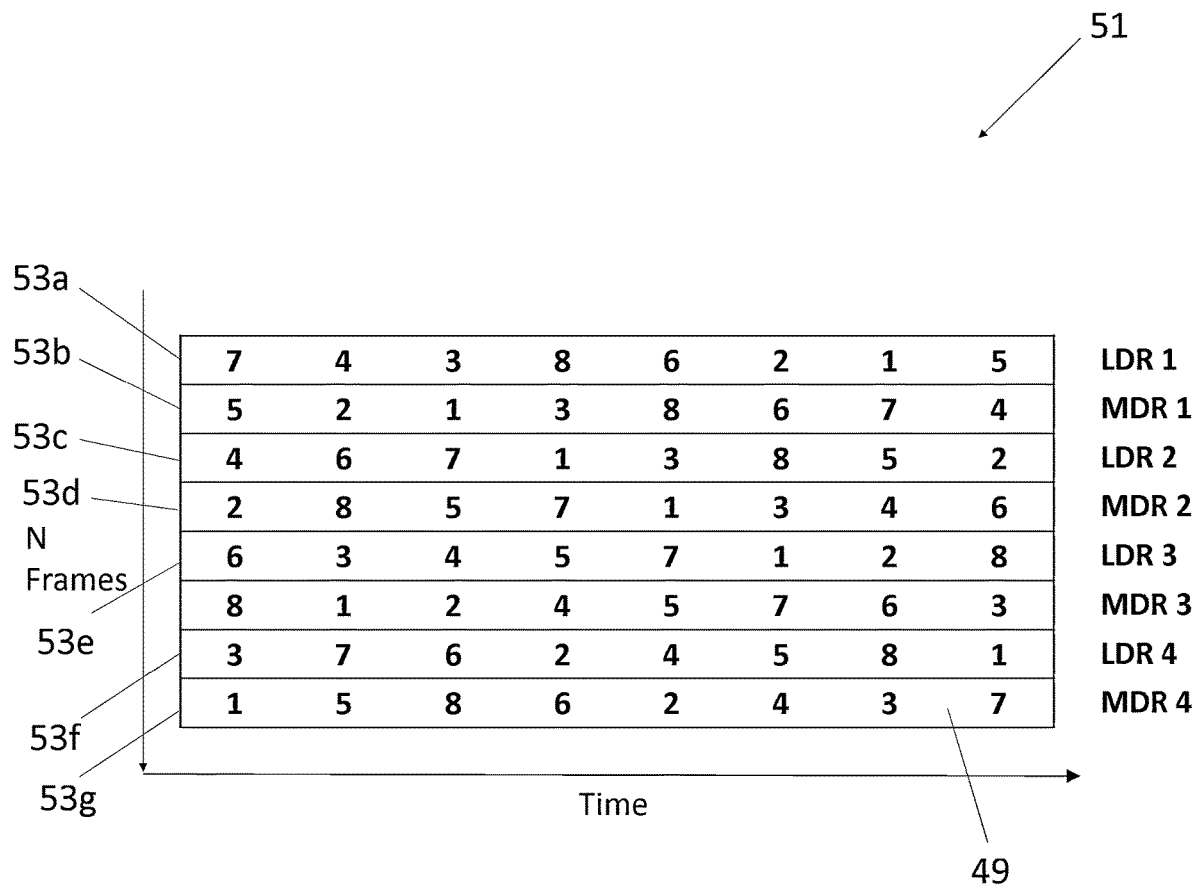

In a fifth step 51 of the method of the first example embodiment of the invention, one at a time, each of the eight rows of the shuffled matrix 49 are selected, one for each of the eight data streams to be transmitted (FIG. 8). For each transmitting terminal T1, T2, T3, T4 there is a low data rate LDR and medium data rate MDR data stream to be transmitted, giving in total eight data streams to be transmitted LDR 1, MDR 1, LDR 2, MDR 2, LDR 3, MDR 3, LDR 4, MDR 4. Each selected row of the shuffled matrix 49 represents a distinct frequency-hopping sequence 53a-53h. The frequency-hopping sequences are mutually orthogonal (i.e., non-overlapping) so that data may be transmitted on the eight sub-bands simultaneously while avoiding interference. Furthermore, there is no repeat of any particular frequency sub-band within any given frequency-hopping sequence: the frequency-hopping sequences are "non-repeating". In a further advantage, the frequency-hopping sequences are pseudo-random.

In transmission, each data stream switches from frequency to frequency across the spread spectrum bandwidth according to the assigned frequency-hopping sequence, and to a switching frequency set by a common clock (not shown). The switching time interval may be in the range of 0.1 ms-10 ms, for example 1 ms. In the first example embodiment of the invention, for each data stream, when the selected frequency-hopping sequence has been used entirely, it is re-used and re-used again as many times as is required to complete each transmission. No single frequency is visited more than once, within any given cycle of the frequency-hopping sequence, but for a typical transmission length, each frequency-hopping sequence is used repeatedly on a given data stream. A data stream transmitted in this manner may require many cycles, for example thousands of cycles of a frequency-hopping sequence if the message to be transmitted is large (e.g., a video). In an alternative embodiment, new frequency-hopping sequences are continuously generated throughout transmission and no single frequency-hopping sequence is used more than once (i.e., there is no recycling of sequences). Such an embodiment may provide enhanced unpredictability and a further increase in transmission security, at the expense of processing efficiency. In an alternative embodiment, if the message to be transmitted is small (e.g., a control signal), it may be possible to transmit the signal in a single data burst, requiring just a single hopping frequency.

The original signals are recovered by the receiver (not shown) of the receiving terminal T10, by searching across the available bandwidth 35. In order to demodulate and re-construct the data streams, the receiver requires knowledge of the frequency-hopping sequences. In the first example embodiment of the invention, the frequency-hopping sequences generated independently by the transmitter, since the transmitter has access to the same seed based on time-of-day.

If further, independent, hopping sequences are required, for example if a new data stream is to be transmitted (or for the continued transmission of a data stream), the steps of the method may be repeated.

In the first example embodiment of the invention, the frequency-hopping sequences are pseudo-random; however, in an advantage over methods of the prior art, it is guaranteed that no frequency sub-band is re-used in any given frequency-hopping sequence ensuring maximum efficiency of utilization of available bandwidth. This means that during data stream transmission, no frequency sub-band is re-used until all possible frequency sub-bands have been used once, giving one unique hop cycle (which can be repeated in transmission as required). Moreover, at any given time, the full available satellite bandwidth is occupied. In a further advantageous feature of the first example embodiment of the invention, all generated frequency-hopping sequences are orthogonal (no data stream occupies the same frequency sub-band of any other data stream at the same time).

In a second example embodiment of the invention, the sequence generator module 15, 15' of the transmitting terminals T1, T2, T3, T4, of the satellite communications system 1 executes a series of steps to generate a plurality of repeating (rather than non-repeating) frequency-hopping sequences. In contrast to the first example embodiment of the invention, in the second example embodiment of the invention, sixteen, orthogonal, frequency-hopping sequences are provided. In the second example embodiment of the invention, since there are still eight available sub-bands, the frequency-hopping sequences are joined end-to-end to make eight sequences of twice the length, with guaranteed orthogonality and zero sub-band clashes.

In the second example embodiment of the invention, the same satellite communications system 1 operates to generate frequency-hopping sequences (refer back to FIGS. 1-2). At a high level, the method of the second example embodiment of the invention comprises the same steps as in the first example embodiment of the invention (refer back to FIG. 3): the method comprises the steps of generating an initial frame, generating further frames, and shuffling columns and/or rows within the resulting matrix. In more detail, the method differs.

In more detail, in a first step 55 of the method of the second example embodiment of the invention, the available transmission bandwidth 35 is divided into a number, N of distinct frequency sub-bands (refer back to FIG. 4). In the second example embodiment of the invention, N=eight, similar to the first example embodiment of the invention, corresponding to the number of data streams. In addition, a number, M, of starting sequences is selected. In the second example embodiment of the invention, M=two. In the second example embodiment of the invention, the numbers N and M are selected so that the number of data streams to be transmitted is less than the product NM, thus allowing for full system loading as will be described further herein. In another example embodiment of the invention, M may be randomly (or in practice, pseudo-randomly) selected, providing a further level of security.

Figure 9:
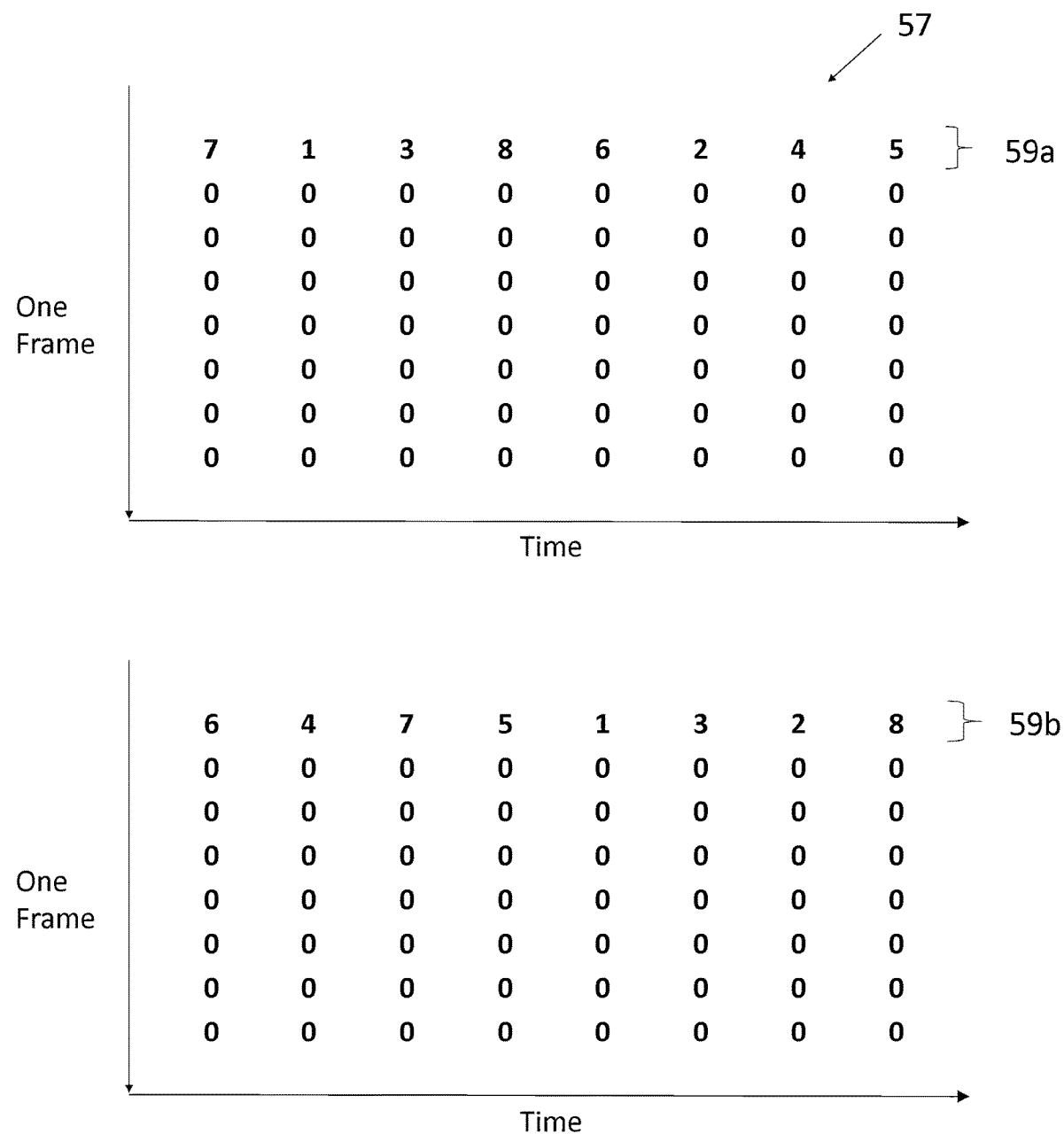
FIGS. 9-14 are schematic diagrams of the steps of the method of the second example embodiment of the invention.

In a second step 57 of the method of the second example embodiment of the invention, a shuffle algorithm is run M times (i.e., in the second example embodiment, twice), acting on a time-of-day seed, to generate M (i.e. two) separate initial hopping frames 59a, 59b, each containing a random ordering of the N (i.e. eight) sub-band frequencies (i.e., in the second example embodiment of the invention, a pseudo-random ordering of digits 1-8 representing the eight sub-bands) (FIG. 9). In the second example embodiment, the shuffle algorithm used is Fisher-Yates, although others could also be used.

Figure 10:
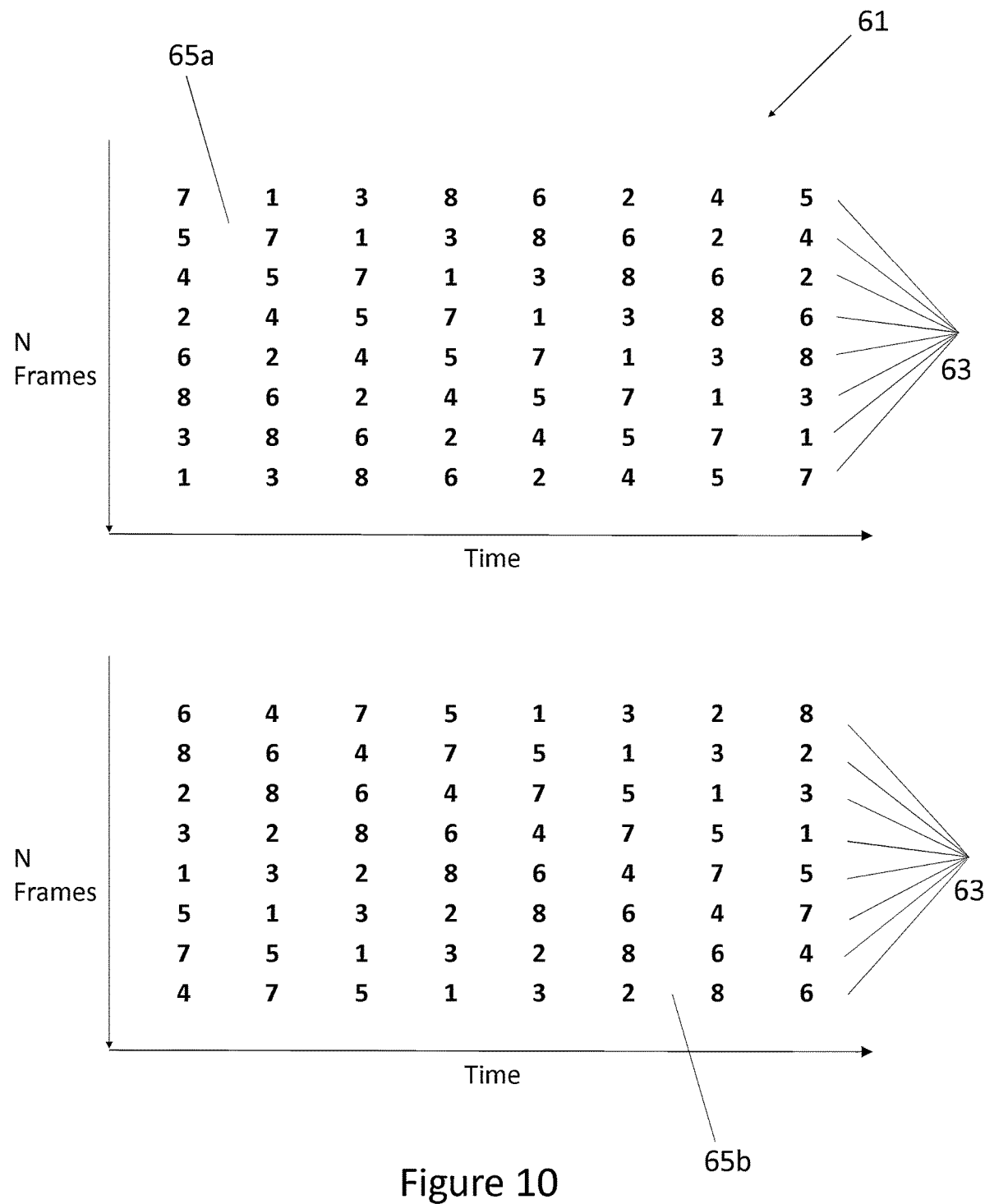

In a third step 61 of the method of the second example embodiment of the invention, for each of the M initial hopping frames 59a, 59b, N−1 (i.e., in the second example embodiment of the invention, seven) further hopping frames are generated, thereby generating a total of N×M frames 63 (FIG. 10). The further hopping frames 63 are generated by "cyclic shifting" to provide two separate two-dimensional N×N (i.e., eight×eight) square matrices 65a, 65b.

Figure 11:
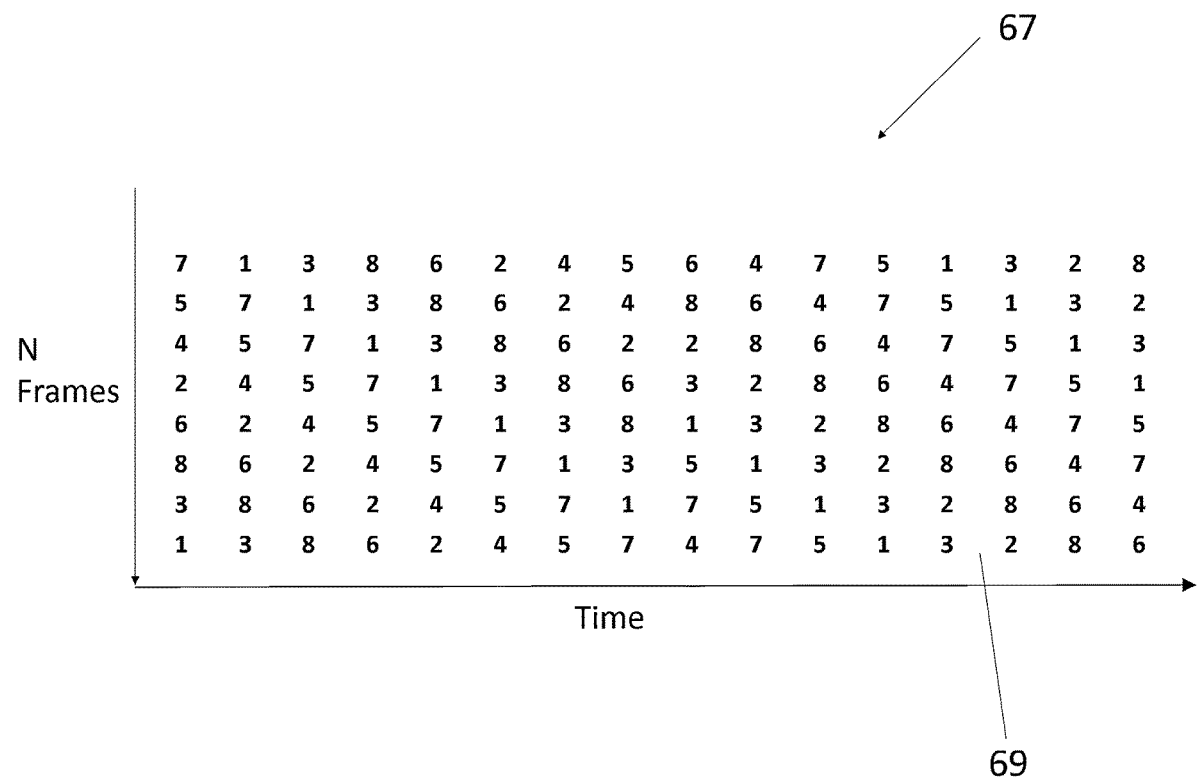

In a fourth step 67 of the method of the second example embodiment of the invention, the M (i.e., two) matrices are combined side-by-side, providing a N×MN rectangular matrix 69 (FIG. 11). In an alternative embodiment of the invention, this step may be omitted and the matrices may be processed separately.

Figure 12:
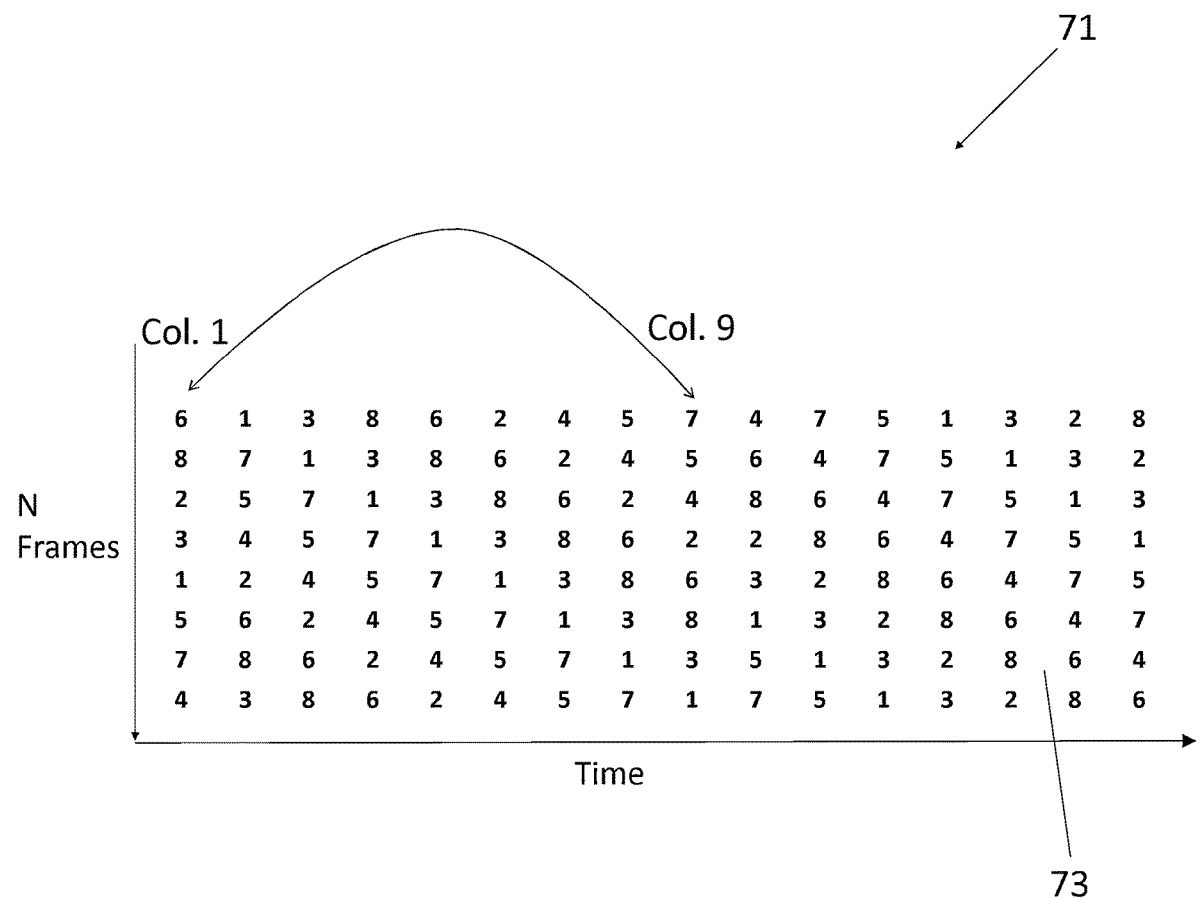

In a fifth step 71 of the method of the second example embodiment of the invention, a further shuffle algorithm is run (in the second example embodiment of the invention, also Fisher-Yates), acting on a second, different, pseudo-random time-of-day seed, to shuffle the columns between the M (i.e., two) matrices providing a shuffled matrix 73 (FIG. 12). For a guaranteed repeat in each sequence, the net result of the shuffling is that at least one column or row is shuffled in each of the M matrices within the extended matrix (i.e., in the second example embodiment of the invention, from one matrix to the other matrix). In other words, when the extended is matrix is split out, the separate M matrices each contain at least one shuffled column or row. In the second example embodiment of the invention, columns one and nine have been swapped in the pseudo-random shuffle (column one belonging to one matrix and column nine belonging to the other matrix). In another embodiment more than two columns may be shuffled between the matrices, or indeed all of the columns may be shuffled as long as the net effect is that at least one column is transferred from one matrix to the other. If, in another example embodiment, M is greater than two, for example, five, or six, a similar principle will apply: the net result of the shuffling must be that at least one column or row is shuffled in each matrix. For a guaranteed repeat in each combined sequence (rather than each sequence), it is not necessarily a requirement to have as a net result, at least one column or row shuffled in each matrix.

Figure 13:
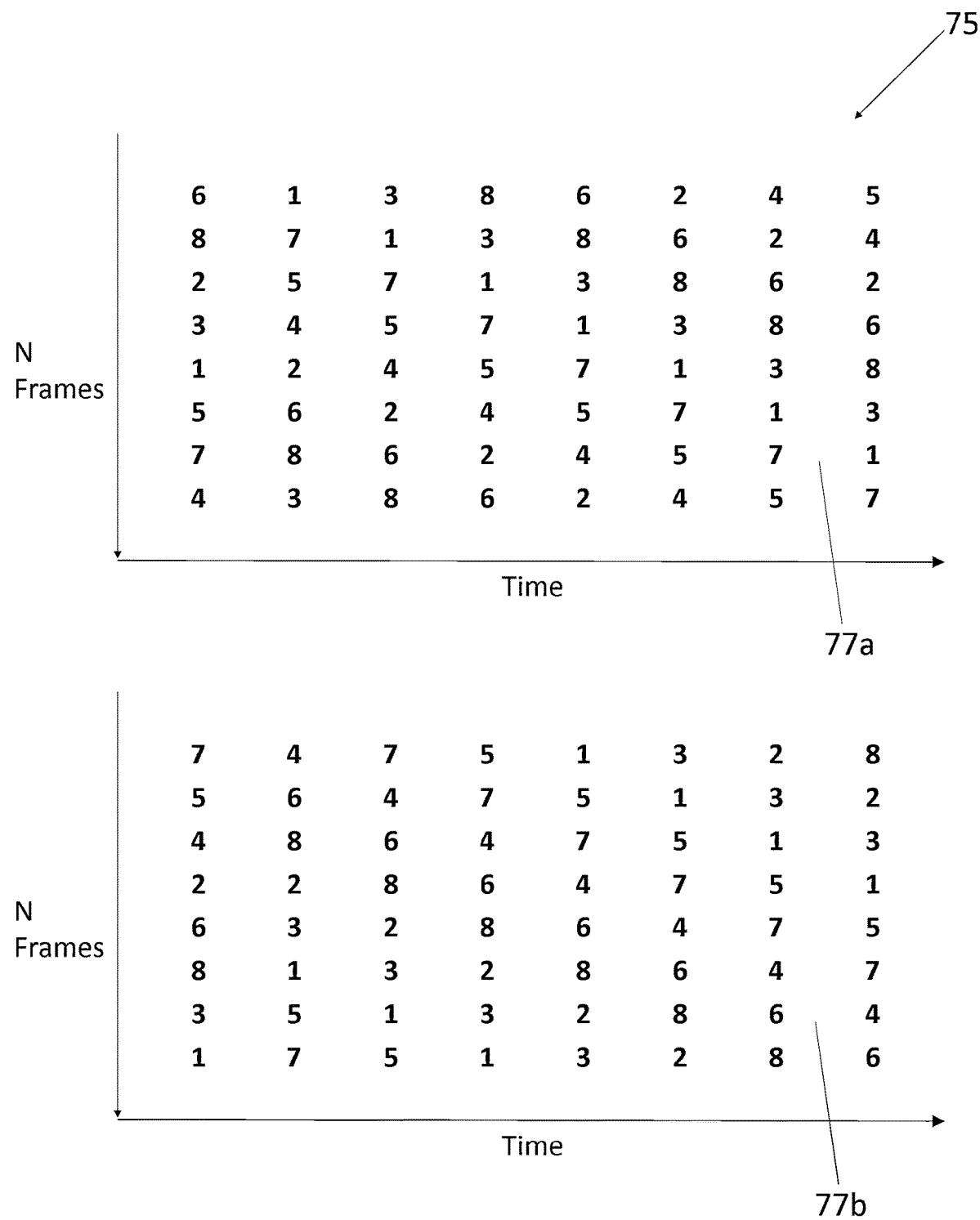

In a sixth step 75 of the method of the second example embodiment of the invention, the N×MN rectangular shuffled matrix 73 is split back into M square N×N matrices 77a, 77b (FIG. 13).

Figure 14:
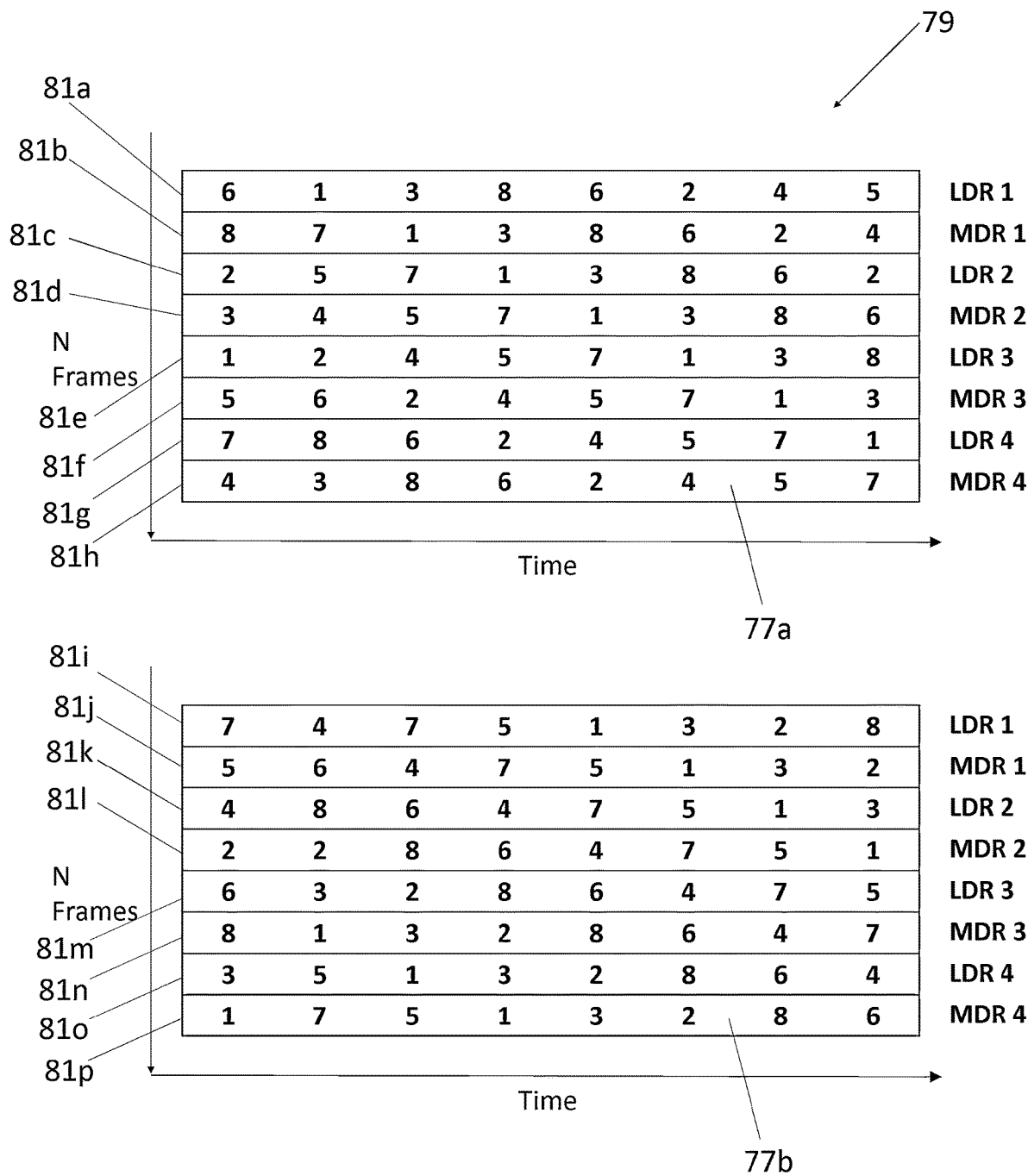

In a seventh step 79 of the method of the second example embodiment of the invention, one at a time, each of the eight rows of each of the M matrices are selected, two for each of the eight data streams to be transmitted (FIG. 14). In the second example embodiment, the rows of the first separated matrix are selected first, before the rows of subsequent matrices are selected; however, in an alternative embodiment rows may be selected in a different order, or even indeed in a random order. Each selected row represents a distinct pseudo-random frequency-hopping sequence 81a-81p. All of the eight frequency-hopping sequences 81a-81h in one separated matrix 77a are mutually orthogonal (i.e., non overlapping) so that data may be transmitted on the eight sub-bands simultaneously while avoiding interference. Similarly, all of the eight frequency-hopping sequences 81i-81p in the other separated matrix 77b are mutually orthogonal (i.e., non overlapping) so that data may be transmitted on the eight sub-bands simultaneously while avoiding interference. However, unlike in the first example embodiment of the invention, there is a guaranteed repeat of a frequency sub-band within each frequency-hopping sequence. In the second example embodiment of the invention, where M=2, each sub-band frequency can be repeated (i.e., be present) a maximum of two times within any given frequency-hopping sequence. In another embodiment, where M=3, each sub-band frequency could be repeated a maximum of three times within any given frequency-hopping sequence 53, and so on. In the second example embodiment of the invention compared to the first, there is additional anti jam security provided by the addition of variable, M.

In the second example embodiment of the invention, only one sub-band frequency is repeated in each frequency-hopping sequence 81a-81p (all the other sub-band frequencies occur only once in each frequency-hopping sequence). In an alternative embodiment of the invention, where M=2 but the net result of the column shuffling is that more than one column is transferred from one matrix to the other, more than one sub-band frequency could be repeated within each frequency-hopping sequence, although each sub-band frequency can still only be repeated a maximum of M times.

As in the first example embodiment of the invention, in transmission, each data stream switches from frequency to frequency across the spread spectrum bandwidth according to an assigned frequency-hopping sequence, and to a switching frequency set by a common clock (not shown). The assigned frequency-hopping sequence is a longer sequence comprised of sixteen hops, formed from combining a frequency-hopping sequence selected from the first shuffled matrix 77a (e.g., the first row) and a frequency-hopping sequence selected from the second shuffled matrix 77b (e.g., the first row). In this embodiment, the combining is done in the same order (i.e., always a sequence from the first matrix first combined with a sequence from the second matrix second, or vice versa) in order to preserve orthogonality (in other words, the combined matrices are treated as a single matrix). For each data stream, when the combined, longer, frequency-hopping sequence has been used entirely, it is re-used and re-used again as many times as is required to complete each transmission. As in the first example embodiment of the invention, a given data stream to be transmitted may require many thousands of cycles of a frequency-hopping sequence if the message to be transmitted is for example, a large image or video. In an alternative embodiment, the frequency-hopping sequences may be generated continuously, with each combined, longer, sequence used only once in transmission.

Similar to the first example embodiment of the invention, after transmission, the original signals are recovered by the modem of the receiving terminal T10, by searching across the available bandwidth. In order to demodulate and reconstruct the data streams, the receiver requires knowledge of the frequency-hopping sequences. In the second example embodiment of the invention, like the first, the frequency-hopping sequences generated independently by the transmitter, since the transmitter has access to the same seed based on time-of-day.

If further, independent, frequency-hopping sequences are required, for example if a new data stream is to be transmitted (or for the continued transmission of a data stream), the steps of the method may be repeated.

Similar to the first example embodiment of the invention, the frequency-hopping sequences 81a-81p generated using the second example embodiment of the invention, are pseudo-random and orthogonal (within each separated matrix). However, unlike the first example embodiment of the invention, in the second example embodiment of the invention, it is guaranteed that at least one frequency sub-band is repeated, and is repeated a maximum of M times in any given frequency-hopping sequence. At full occupancy, looking across all generated frequency-hopping sequences, each frequency sub-band is repeated M times in total. However, unlike the first example embodiment of the invention, in the second example embodiment of the invention, it is guaranteed that at least one frequency sub-band is repeated, and is repeated a maximum of M times in any given frequency-hopping sequence.

M can be changed during transmission (after the method has been run at least one complete time), for example continuously pseudo-randomly generated during transmission, adding further levels of unpredictability. Therefore, the method of the second example embodiment of the invention may add an additional advantage over the first, since any hop monitoring equipment is not able to predict ensuing frequency sub-bands with increasing probability after each sub-band is used.

While the present invention has been described and illustrated with reference to particular embodiments, it will be appreciated by those of ordinary skill in the art that the invention lends itself to many different variations not specifically illustrated herein. By way of example only, certain possible variations will now be described. In an alternative embodiment of the invention, another kind of pseudo-random seed may be used in place of a time-of-day based seed. In an alternative embodiment of the invention, there may not be full-system occupancy. In an alternative embodiment of the invention, there may be a greater number of sub-bands and/or a greater number of data streams to be transmitted.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, while of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of assigning use of a bandwidth for radio communication, the method comprising the following steps:
   a. generating an initial frame, the initial frame comprising a series of allocations;
   b. generating a further frame, the further frame comprising a series of allocations;
   c. repeating step b. to generate a matrix of allocations;
   d. shuffling at least two columns or at least two rows within the matrix;
   e. selecting one or more columns or rows in the matrix, wherein each selected column or row represents a selected sequence;
   f. assigning use of the bandwidth according to the one or more selected sequences; and
   g. transmitting one or more data streams on the assigned bandwidth
   wherein the step of generating the initial frame comprises pseudo-random generation using a shuffle algorithm, and wherein the pseudo-random generation comprises using an external random number generator to generate a pseudo-random number based on time of day.

2. The method according to claim 1, wherein the method is a method of generating one or more frequency-hopping sequences for frequency-hopping spread spectrum transmission, and wherein the bandwidth comprises a plurality of sub-bands, and wherein the allocations are hops, each hop representing a different sub-band.

3. The method according to claim 1, wherein the method is a method of generating one or more time-hopping sequences for time-hopping transmission, and wherein the allocations are time-slots.

4. The method according to claim 1, wherein the method is a method of radio resource allocation, and the allocations are frequency channels.

5. The method according to claim 1, wherein shuffling at least two columns or at least two rows comprises pseudo-random shuffling using a shuffle algorithm.

6. The method according to claim 1, wherein the shuffle algorithm is a Fisher-Yates, Knuth or Sattolo algorithm.

7. The method according to claim 1 further comprising the step of:
   h. repeating steps a-d of the method, thereby generating one or more additional matrices with shuffled columns or rows.

8. The method according to claim 1 further comprising the step of:
   i. before step d, repeating steps a-c M times.

9. The method according to claim 8 further comprising the step of:
   j. performing step d between the M matrices such that the net result of the shuffling is that there is at least one column or row shuffled in every matrix.

10. The method according to claim 9 further comprising the steps of:
    k. before step d, combining the M matrices; and
    l. After step d, splitting out the matrices into M separate matrices.

11. A communications terminal comprising a transmitter, the transmitter comprising a sequence generation module configured to perform steps a-e of the method of claim 2, and the transmitter configured to assign use of a bandwidth according to the one or more selected sequences, and to transmit one or more data streams on the assigned bandwidth in accordance with the one or more selected sequences.

12. The communications terminal according to claim 11 further comprising a receiver, the receiver comprising a sequence generation module configured to perform steps a-e of the method, and the receiver configured to receive one or more data streams and extract information from the one or more data streams using the one or more selected sequences.

13. A modem configured for use in the communications terminal according to claim 11 wherein the modem is a software-defined radio satellite modem.

14. A computer program configured to execute the steps of the method according to claim 1.

15. A method of generating one or more frequency-hopping sequences for frequency-hopping spread spectrum transmission over a bandwidth comprising a plurality of sub-bands, the method comprising the following steps:
    a. generating an initial frame, the initial frame comprising a series of hops wherein each hop represents a different sub-band;
    b. generating a further frame, the further frame comprising a series of hops wherein each hop represents a different sub-band;
    c. repeating step b. to generate a matrix of hops;
    d. shuffling at least two columns or at least two rows within the matrix wherein the step of generating the initial frame comprises pseudo-random generation using a shuffle algorithm, and wherein the pseudo-random generation comprises using an external random number generator to generate a pseudo-random number based on time of day, and wherein the method further comprises:
    l. Generating one or more frequency-hopping sequences using steps a. to d.; and
    m. transmitting one or more data streams on the bandwidth, in accordance with the one or more frequency-hopping sequences.

16. The method of generating one or more frequency-hopping sequences according to claim 15, further comprising the step of:
    e. selecting one or more columns or rows in the matrix, wherein each selected column or row represents a frequency-hopping sequence.

17. The method of extracting information from one or more data streams transmitted according to the method of claim 2, the method comprising the following steps:
    n. generating an initial frame, the initial frame comprising a series of allocations;
    o. generating a further frame, the further frame comprising a series of allocations;
    p. repeating step b. to generate a matrix of allocations;

q. shuffling at least two columns or at least two rows within the matrix;
r. selecting one or more columns or rows in the matrix, wherein each selected column or row represents a sequence;
s. receiving the one or more transmitted data streams; and
t. extracting information from the one or more transmitted data streams using the selected sequences.

* * * * *